Aug. 27, 1940.                H. F. GRAVE                2,213,086

CURRENT RESPONSIVE INSTRUMENT

Filed Dec. 8, 1937

Inventor:
Hans F. Grave,
by Harry E. Dunham
His Attorney.

Patented Aug. 27, 1940

2,213,086

UNITED STATES PATENT OFFICE 2,213,086

CURRENT RESPONSIVE INSTRUMENT

Hans F. Grave, Hanover, Germany, assignor to General Electric Company, a corporation of New York Application December 8, 1937, Serial No. 178,820
In Germany December 14, 1936

3 Claims. (Cl. 171—95)

My invention relates to current responsive instruments and concerns particularly both current and voltage-measuring devices.

It is an object of my invention to provide an improved arrangement having high sensitivity for measuring alternating currents and voltages.

It is also an object of my invention to overcome frequency error.

It is still a further object of my invention to provide an arrangement which is suitable for the use of current responsive elements having relatively high inductance. Further and other objects and advantages will become apparent as the description proceeds.

In carrying out my invention in its preferred form I utilize a direct current galvanometer of the D'Arsonval type, for example, in the Graetz or Bridge connection of rectifiers and I provide a capacitative impedance in parallel with the bridge for the purpose of compensating for frequency errors.

Figure 1:
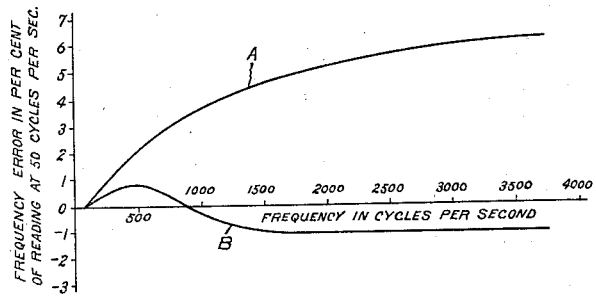
Figure 2:
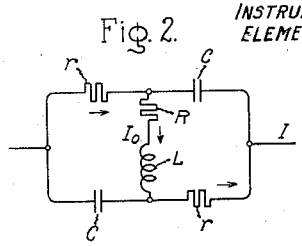
Figure 3:
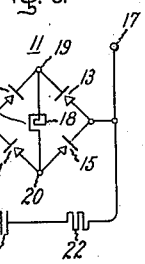
Figure 4:
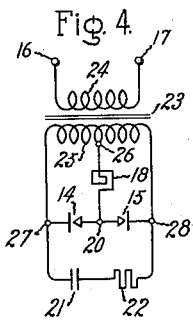
Figure 5:
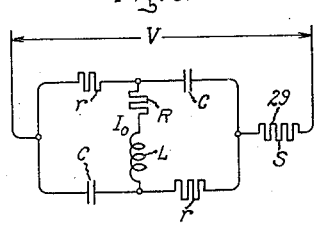
Figure 6:
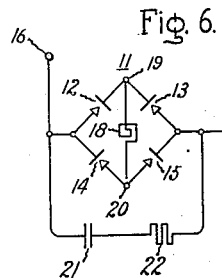
Figure 7:
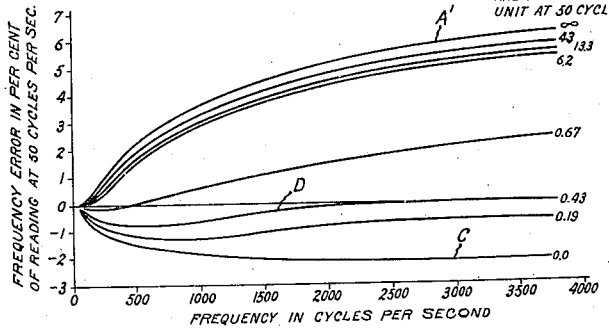

My invention will be understood more readily from the following detailed description when considered in connection with the accompanying drawing and those features which are believed to be novel and patentable will be pointed out in the claims appended hereto. In the drawing, Figure 1 is a graph illustrating the principle of operation of my invention when used in ammeters and in certain classes of voltmeters. Figure 2 is a diagram representing the equivalent circuit of the conventional rectifier instrument connected in the Graetz circuit. Figure 3 is a circuit diagram of one embodiment of my invention. Figure 4 is a circuit diagram of another embodiment of my invention utilizing a push-pull bridge circuit instead of the four-rectifier or Graetz bridge circuit. Figure 5 is a diagram representing the equivalent circuit of the conventional rectifier voltmeter in the Graetz circuit. Figure 6 is a circuit diagram of an embodiment of my invention arranged as a voltmeter and Figure 7 is a graph illustrating the principle of operation of my invention in voltmeters. Like reference characteristics are utilized throughout the drawing to designate like parts.

In view of the fact that the effect of dry rectifiers is dependent upon frequency, instruments of the rectifier type equipped with copper-oxide or selenium rectifiers give indications which vary considerably with variations in frequency. This phenomenon appears to result in part from the capacitance of the rectifier plates which causes a rectifying effect decreasing with increasing frequency, that is, a negative frequency error. Inasmuch as the rectifier is intended to block current entirely in one direction any effect such as a capacitative effect which permits the current to flow in either direction tends to make the instrument read too low, that is, gives it a negative error.

However, when the galvanometer or instrument element is one having a considerable inductance the capacitative effect of the dry rectifiers tends to give the combined instrument a positive error instead of a negative one for the reason that the dry rectifiers acting as condensers tend to store up charges which are prevented from flowing through the instrument element except when a current is flowing in a positive direction for the reason that the inductance of the instrument element tends to oppose stoppage of the flow of current therethrough.

This problem arises particularly in case of large switchboard and recording instruments having deflecting elements with large numbers of turns and high inductance. If such an instrument arranged in the conventional Graetz circuit with dry rectifiers is connected as an ammeter a frequency characteristic results such as that shown by curve A of Figure 1. It will be seen that a positive frequency error occurs.

In accordance with my invention the error indicated is diminished or overcome by use of an artificial circuit with rectifier measuring instruments containing highly inductive deflecting instrument elements. In the case of ammeters the artificial circuit preferably takes the form of a capacitative impedance connected in parallel with the terminals of the usual current responsive unit. The capacitative impedance preferably consists of a condenser and ohmic resistance in series. In the form of the invention shown in Figure 3 there is a Graetz bridge 11 consisting of four dry rectifiers 12, 13, 14, and 15 arranged in two pairs, each of which is connected in series opposition to the end terminals connected to the input terminals 16 and 17 of the current responsive unit. There is a current responsive instrument element such as the D'Arsonval galvanometer 18, for example, connected in the cross circuit of the bridge between the common terminals 19 and 20 of the two pairs of series opposed dry rectifiers 12, 13 and 14, 15 respectively. For the purpose of obtaining frequency compensation a capacitative impedance consisting of a condenser 21 and a resistor 22 in series, are connected across the input terminals 16 and 17 in parallel cooperative relationship to the bridge 11.

The principle of operation of the embodiment of the invention illustrated in Figure 3 may be understood more readily from a consideration of the equivalent circuit of the conventional Graetz circuit rectifier instrument represented in Figure 2.

In Figure 2, $r$ represents the pass resistance of the dry rectifiers 12 and 15. C represents the back capacitance of the dry rectifiers 13 and 14 respectively, the blocking resistance and the series capacitance being neglected. R represents the ohmic resistance and L the inductance of the winding of the current responsive instrument element 18. I represents the current to be measured and $I_0$ represents the current flowing in the instrument element 18. By setting up the equations of current and voltage according to Kirchhoff's Laws for the electrical circuit represented in Figure 2 and solving for $I_0$, the following equation results:

$$I_0 = I \cdot \frac{\frac{1}{j\omega C} - r}{2(R+j\omega L) + \frac{1}{j\omega C} + r} = I.K_i$$

It will be understood that $j$ is $\sqrt{-1}$ and $\omega$ is $2\pi$ times the frequency. For the values of C, L, R usually encountered in practice $K_i$ increases with increasing frequency within the usual operating range. The curve A represents the percentage error in terms of the indication at a frequency of 50 cycles per second plotted against frequency.

The use of the capacitative impedance in parallel co-operative relationship to the rectifier bridge overcomes the increase in value of $I_0$ with the increase in frequency. The corresponding error with the capacitative impedance connected in parallel relationship is shown by curve B in Figure 1.

In Figure 3, I have illustrated the application of my invention to the conventional Graetz bridge circuit but it will be understood that my invention is not limited thereto, for example, in the case of a transformer bridge or push-pull circuit as illustrated in Figure 4 the capacitative impedance consisting of the condenser 21 and the resistor 22 is likewise connected in parallel co-operative relationship to the rectifier bridge. The arrangement of Figure 4 includes a current transformer 23 having a primary winding 24 and a secondary winding 25 with an intermediate tap 26. A single pair of dry rectifiers 14 and 15 connected in series opposition is arranged with the end terminals 27 and 28 connected across the secondary winding 25 of the transformer 23. The instrument element 18 is connected in a cross circuit between the intermediate points of the bridge in the usual manner, in this case between the intermediate point 26 of the transformer winding 25 and the common terminal 29 of the rectifiers 14 and 15. It will be understood, of course, that the optimum values of capacity and resistance of the circuit elements 21 and 22 will not necessarily be the same in the arrangements of Figures 3 and 4.

If the conventional Graetz circuit instrument is arranged as a voltmeter with a resistance multiplier 29, an equivalent circuit results such as illustrated in Figure 5. In this case the symbols previously used have the same significance as in connection with Figure 2. In addition the resistance of the multiplier 29 is represented by the symbol S and the applied voltage to be measured is represented by the symbol V. The current flowing through the moving coil element 18 is then represented by equation:

$$I_0 = V \cdot \frac{\frac{1}{j\omega C} - r}{S\left[r + \frac{1}{j\omega C} + 2(R+j\omega L)\right] + (R+j\omega L)\left(r + \frac{1}{j\omega C}\right) + 2r\frac{1}{j\omega C}} = V.K_v$$

If the series resistance S is made so large that the second and third terms in the denominator become negligible with respect to the first term the equation for the voltmeter becomes the equation previously given for the ammeter. That is, voltmeters with high resistance multipliers behave like ammeters and the current responsive units in such voltmeters may be compensated in the same manner as described in connection with Figures 3 and 4 namely, by connecting a capacitative impedance in parallel therewith. A corresponding voltmeter arrangement consisting of the current responsive unit of Figure 3 in series with the voltage multiplier 29 is illustrated in Figure 6.

If the series resistance of the voltmeter is made equal to zero instead of being very large the current in the current indicating coil 18 is given by the following equation:

$$I_0 = V \cdot \frac{\frac{1}{j\omega C} - r}{(R+j\omega L) \cdot \left(r + \frac{1}{j\omega C}\right) + 2r\frac{1}{j\omega C}} = V.Kv_0$$

In contra-distinction to $K_i$, $$K_{v_0}$$

decreases with frequency under the same conditions as above, as shown by curve C in Figure 7. With a high resistance connected in series, $K_v$ becomes $K_i$ divided by S and an error curve A' as illustrated in Figure 7 results. With a smaller resistance in series the curves between A' and C result. It is evident, therefore, that the influence of frequency becomes a minimum for a certain value of S. In this case the error follows curve D. By utilizing suitable values of $r$, C, L, and R, such a small optimum value of S can be obtained, that the voltage measuring instrument may also be used as an ammeter arranged in shunt without the voltage drop across the shunt resistance becoming inadmissibly high. The numbers appearing at the ends of the curves in Figure 7 represent the relationships for the various curves between the series resistance S and the impedance of the combined current responsive unit at 50 cycles per second.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:

1. A frequency compensated voltmeter for alternating current circuits comprising a current responsive unit and a resistor in series therewith, having a resistance relatively great in comparison with impedance of the current responsive unit, said current responsive unit comprising a rectifier bridge having an inductive current responsive instrument element connected in a cross circuit thereof and a capacitative impedance connected in parallel with the rectifier bridge.

2. A voltmeter for alternating current circuits comprising a current responsive unit and a resistor connected in series therewith, said current responsive unit comprising a rectifier bridge having a cross circuit in which an inductive current responsive instrument element is connected and having a capacitative impedance connected in parallel with the rectifier bridge, the resistance of said series resistor being so related to the impedance of the elements of the current responsive unit as to compensate for unequal variations in impedance of the component parts of the unit with variations in frequency.

3. A frequency compensated voltmeter for alternating current circuits comprising a current responsive unit and a resistor in series therewith, said current responsive unit comprising an inductive rectifier bridge having a current responsive instrument element connected in a cross circuit thereof and a capacitative impedance connected in parallel with the rectifier bridge, said resistor having an impedance lying between $\frac{1}{5}$ and $\frac{3}{4}$ of the impedance of the current responsive unit at 50 cycles per second.

HANS F. GRAVE.

CERTIFICATE OF CORRECTION.

Patent No. 2,213,086. August 27, 1940.

HANS F. GRAVE.

It is hereby certified that error appears in the printed specification of the above numbered patent requiring correction as follows: Page 3, second column, lines 6 and 7, claim 3, for the words "an inductive rectifier bridge having a" read --a rectifier bridge having an inductive--; and that the said Letters Patent should be read with this correction therein that the same may conform to the record of the case in the Patent Office.

Signed and sealed this 15th day of October, A. D. 1940.

(Seal)

Henry Van Arsdale,
Acting Commissioner of Patents.